(No Model.) 2 Sheets—Sheet 1.

S. W. GEERY, F. W. JACKSON & C. B. DAY.
SHUTTER FOR PHOTOGRAPHIC CAMERAS.

No. 335,518. Patented Feb. 2, 1886.

Attest:
Frdk. F. Campbell.
Oscar A. Michel.

Inventors:
Samuel W. Geery,
Francis W. Jackson,
Charles B. Day,
By Drake & Co. Attys.

(No Model.) 2 Sheets—Sheet 2.

S. W. GEERY, F. W. JACKSON & C. B. DAY.
SHUTTER FOR PHOTOGRAPHIC CAMERAS.

No. 335,518. Patented Feb. 2, 1886.

WITNESSES: INVENTORS:
Frdk. F. Campbell Samuel W. Geery,
R. L. McNulty Francis W. Jackson and
Charles B. Day, BY Drake & Co., ATTYS.

UNITED STATES PATENT OFFICE.

SAMUEL W. GEERY, OF NEWARK, AND FRANCIS W. JACKSON AND CHARLES B. DAY, OF EAST ORANGE, NEW JERSEY.

SHUTTER FOR PHOTOGRAPHIC CAMERAS.

SPECIFICATION forming part of Letters Patent No. 335,518, dated February 2, 1886.

Application filed September 5, 1885. Serial No. 176,233. (No model.)

*To all whom it may concern:*

Be it known that we, SAMUEL W. GEERY, FRANCIS W. JACKSON, and CHARLES B. DAY, citizens of the United States, the first residing at Newark, in the county of Essex and State of New Jersey, and the last two residing at East Orange, Essex county, New Jersey, have invented certain new and useful Improvements in Shutters for Photographic Cameras; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to secure, in a photographic picture, and especially those produced by instantaneous processes, a more uniform tone or tint throughout its surface, or, in other words, to obtain a reproduction of an image or scene in which the lights or shades displayed on one side or part of the surface will be equivalent to or have the same degrees of intensity as those of the other side of said surface, the said picture as a whole being thus a more true representation of the original.

A further object is to secure more perfect definition in pictures of moving objects.

The invention consists in the arrangements and combinations of parts, substantially as will be hereinafter set forth, and finally embodied in the clauses of the claim.

Figure 1:
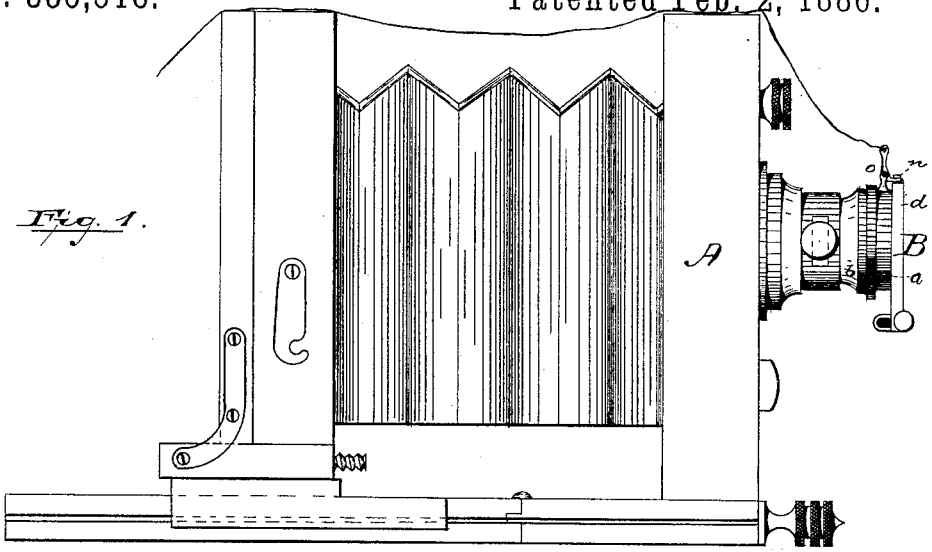
Figure 2:
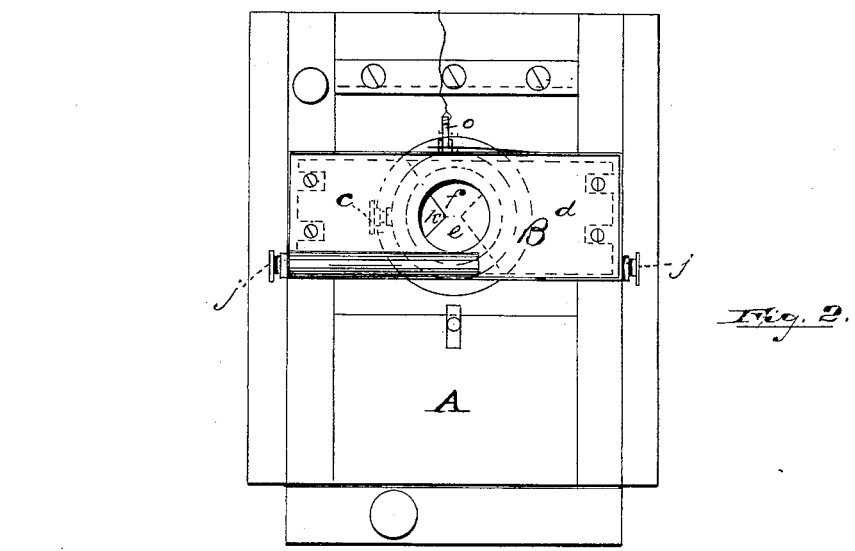
Figure 3:
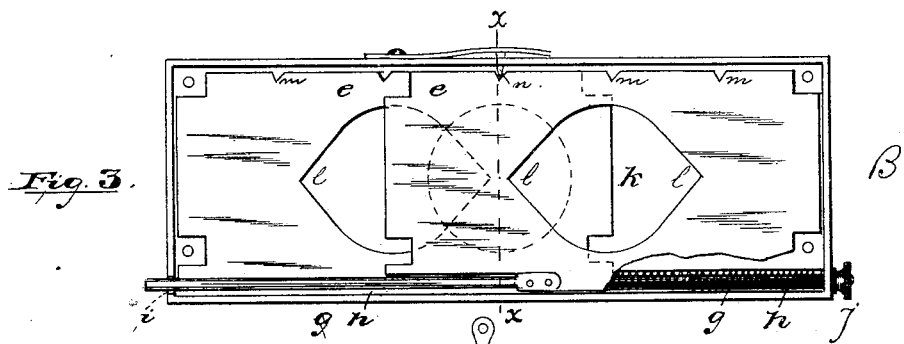
Figure 4:
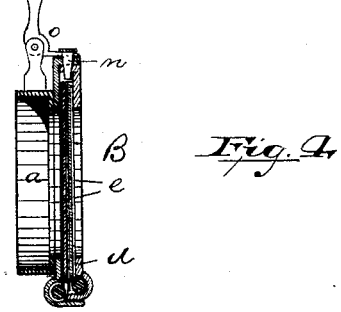
Figure 5:
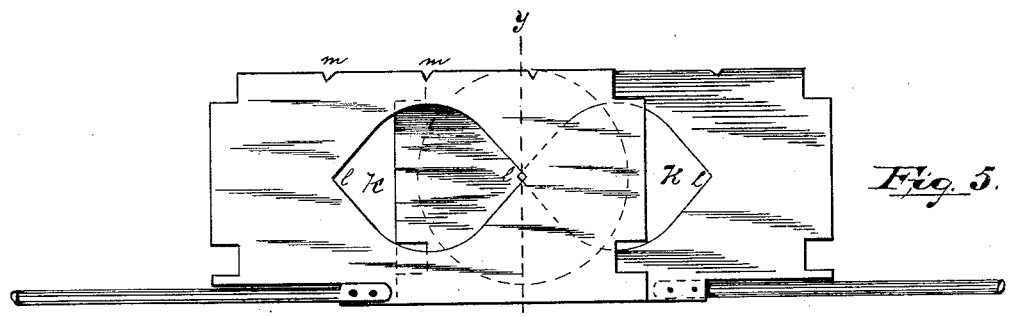
Figure 6:
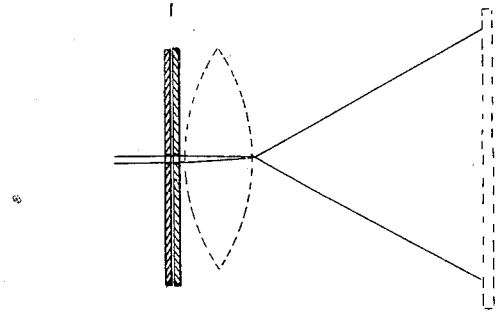

Referring to the accompanying drawings, embraced in two sheets, in which like letters indicate corresponding parts in each of the several figures, Figure 1, Sheet 1, is a side elevation of an ordinary camera having our improvements attached. Fig. 2 is a front elevation of the same. Fig. 3, Sheet 2, is a plan of the improved shutter attachment having one of the inclosing-plates removed to show the arrangement of the operative parts therein. Fig. 4 is an enlarged sectional view of the attachment, taken vertically through line $xx$ of Fig. 3. Fig. 5 is a detail plan showing the relation of two sliding shutter-plates, and Fig. 6 illustrates the relation of said plates to the lens.

In said drawings, A indicates the camera, and B the shutter attached thereto by means of a collar or telescopic band or section, $a$, which fits over the tube $b$ of the camera, and may be held rigidly thereon by a set-screw, $c$, or by any other suitable device.

The receptacle or body $d$ of the improved shutter is composed, preferably, of an oblong and shallow box, case, or sheath, in which is arranged two sliding shutter-plates $e\ e$. The sides of the said case or receptacle are at or approximately at the center perforated, as at $f$, Fig. 2, to allow the rays of light to pass to the lens. The shutter-plates $e\ e$ are arranged in the receptacle in such a relation to the opening or perforation $f$, or to the lens in line therewith, as to move across the same simultaneously from opposite sides, thus materially reducing the time required for cutting off the rays of light. To close the openings quickly and with the least amount of manipulation, we have arranged springs $g\ g$ in connection with the shutter-plates, which said springs have their bearings between said plates and the end walls of the box or receptacle, and thus have a normal tendency to throw the shutters toward and across the opening $f$, whereby said shutters intercept the rays of light passing to the lens.

The peculiar arrangement of the two independent springs at the outer extremities of the shutter-plates enables each of the springs to exert a more effective and certain power or influence over the respective plates, and the liability of the plates to stop in their movements short of a complete cut-off, because of friction generated by the plates sliding closely upon one another, is prevented. Again, because of the peculiar arrangement of springs and draw-bars toward the opposite ends of the plates in the plate-receptacle, the latter is given a balance whereby the liability of its turning when arranged on the camera-tube is obviated, and the appearance of the devices when compared with other similar devices is greatly improved. Said springs $g\ g$ are arranged on drawing rods or bars $h\ h$, which are connected at their inner ends to the shutter-plates, their outer ends extending oppositely through perforations $i\ i$ in the end walls of the receptacle, and being at their extremities provided with finger-pieces *j j*, by means of which the shutters are easily drawn outwardly prior to the process of photographing. The draw-bars may be provided with a screw-thread and the finger-piece be adjustable thereon, to enable the tension of the springs to be increased or diminished at pleasure. The shutter-plates are so formed, and this will appear more clearly upon reference to Figs. 5 and 6, as that the opening through which the rays pass to affect the sensitive surface begins at a point at or approximately at a point in line with the focal center of the lens, as in Fig. 5, and, as the plates move oppositely, widens in every direction from said point and then contracts again to said point, so that during the whole time the shutters are open an equal quantity of rays is admitted to the lens on each of the opposite sides of the said center, and are consequently deposited equally on the sensitive surface in the camera. This effect is accomplished by having in each shutter-plate an opening, recess, aperture, or perforation, *k*, the upper and lower edges of which converge toward a central line passing across the center of the perforation *f*, or across the focal line of the lens. The preferred form of the aperture is shown in the drawings, in which case the said aperture is shown to be a perforation having two sets of converging lines, producing an opening somewhat resembling a diamond, (<>,) the opposite ends being angular, as at *l l*. The shutter-plates, when arranged in a case or receptacle, overlap or slide one at the side of the other, and the openings therein, when the plates are set prior to taking the impression or view, are entirely out of coincidence, as in Fig. 2, being held in said position by the springs *g g*. By drawing the finger-pieces and draw-rods, and with them the shutter-plates oppositely, the two adjacent angles of the openings pass one another and form at the lens-center at first a small opening, as in Fig. 5, through which the light passes and is equally disposed over the whole surface of the sensitive plate within the camera. As the plates continue to move oppositely, the opening enlarges in every direction, the center of the opening remaining in coincidence with that of the lens, so that the light is still equally distributed. In this manner the opening continues to enlarge because of the diverging upper and lower edges of the perforations, until said opening is as large or approximates the size of the perforation *f* of the plate-receptacle when the directions of said edges changing and converging toward the center line crossing the lens or perforation *f*, the said opening contracts and finishes or closes at the focal center as at the opening, as will be readily understood. Thus during the continuance of the flash the rays of light are equally disposed by the lens over the surface of the sensitive plate and an even tone is given to the whole surface of the plate. The sliding plates are at their upper edges provided with a series of notches, *m*, with which a pawl, *n*, engages. Said notches and pawl enable the slides or plates to be set or held closed prior to photographing or held fully open while the lens is being focused; or, again, they may be employed in holding or fixing the sliding plates, so that the opening is smaller than the opening *f* and the shutter-plates may act as or in lieu of an ordinary diaphragm.

The pawl may be connected with any suitable lifting device, *o*, Figs. 1, 2, and 4, by means of which, after the slides have been closed and set by the pawl so that the springs cannot act, said springs may be made to act simultaneously upon the slides to produce the desired result.

We do not wish to be understood as limiting ourselves to the exact shape of the shutter-perforations or to any peculiar arrangement of said shutters, or, again, to the relative arrangement of the said shutters with the lens, as changes may be made in said construction and arrangements without departing from the spirit of this invention. For example, the shutter may be placed at any point behind the lens or between said lens and the sensitive plate and effect practical results.

What we claim as new is—

1. The combination, in a camera, with the tube and lens, of a shutter-receptacle having a collar to engage said tube, and a perforation, *f*, to allow the transmission of the light-rays to the lens, and oppositely-sliding plates each provided at the outer end thereof with a draw-bar and spring, said plates being provided with an aperture with converging and diverging edges, substantially as and for the purposes set forth.

2. In combination, a plate-receptacle having the opposite end walls perforated, spring-actuated plates having draw-bars extending oppositely through the perforations in said opposite end walls, and stopping or holding devices to hold the said plates open or stationary against the action of the spring, substantially as set forth.

3. In combination, the shutter-receptacle having the perforations *f* and *i i*, the notched and oppositely-moving shutter-plates, each having therein apertures with angular opposite ends, draw rods or bars, and springs arranged on said rods and abutting against said plates and the end walls of said receptacles, and a pawl, all said parts being arranged and combined substantially as set forth.

In testimony that we claim the foregoing we have hereunto set our hands this 2d day of September, 1885.

SAMUEL W. GEERY.
FRANCIS W. JACKSON.
CHARLES B. DAY.

Witnesses:
CHARLES H. PELL,
THOS. W. JACKSON.